United States Patent
Ebsen et al.

(10) Patent No.: US 7,216,258 B2
(45) Date of Patent: May 8, 2007

(54) METHOD AND APPARATUS FOR RECOVERING FROM A NON-FATAL FAULT DURING BACKGROUND OPERATIONS

(75) Inventors: David S. Ebsen, Chaska, MN (US); Todd R. Burkey, Savage, MN (US)

(73) Assignee: Xiotech Corporation, Eden Prairie, MN (US)

( * ) Notice: Subject to any disclaimer, the term of this patent is extended or adjusted under 35 U.S.C. 154(b) by 618 days.

(21) Appl. No.: 10/430,460

(22) Filed: May 5, 2003

(65) Prior Publication Data

US 2003/0217310 A1 Nov. 20, 2003

Related U.S. Application Data

(60) Provisional application No. 60/381,426, filed on May 17, 2002.

(51) Int. Cl.
*G06F 11/00* (2006.01)
(52) U.S. Cl. .............................. 714/33; 714/30; 714/9; 714/37
(58) Field of Classification Search .................... 714/5, 714/6, 9, 30, 33, 37
See application file for complete search history.

(56) References Cited

U.S. PATENT DOCUMENTS

| | | | | |
|---|---|---|---|---|
| 6,473,857 B1 * | 10/2002 | Panas et al. | ..................... | 713/2 |
| 6,598,173 B1 * | 7/2003 | Sheikh et al. | ................... | 714/4 |
| 2003/0097487 A1 * | 5/2003 | Rietze et al. | ............... | 709/325 |
| 2004/0073829 A1 * | 4/2004 | Olarig | ........................... | 714/6 |

* cited by examiner

*Primary Examiner*—Scott Baderman
*Assistant Examiner*—Tim Bonura
(74) *Attorney, Agent, or Firm*—McDermott Will & Emery

(57) ABSTRACT

A method and apparatus for reinitializing firmware in the event of a fault in a storage area network comprising at least one storage controller having programmable memory and RAM, said at least one storage controller for controlling data access between at least one host server and a storage device. The method is provided during background operations, and includes detecting a fault and suspending data access commands from the at least one host server. The firmware stored in programmable memory is reinstalled, and the at least one storage controller is reinitialized. The reinstallation of the firmware and reinitializing of the controller is quickly completed such that data access commands from the at least one host server to the at least one storage device are satisfied prior to the host server timing out and initiation a data access error message.

16 Claims, 7 Drawing Sheets

METHOD AND APPARATUS FOR RECOVERING FROM A NON-FATAL FAULT DURING BACKGROUND OPERATIONS

RELATED APPLICATIONS

This application relates to and claims priority from U.S. Application Ser. No. 60/381,426, filed May 17, 2002, and entitled "CRASH AND RECOVER ON THE FLY", the disclosure of which is hereby incorporated by reference in its entirety.

FIELD OF THE INVENTION

The present invention relates to storage area networks and, more particularly, to a method and apparatus for recovering from a non-fatal fault.

BACKGROUND OF THE INVENTION

Networked attached storage (NAS) and storage area networks (SANs) are two recent technologies that attempt to allow computers to access network-connected hard disk drives and other mass storage devices using block-level commands so that the networked storage appears to be accessed as if it were physically attached to the workstation. In a NAS, the storage device connects directly to the network medium and does not require an intermediate server to provide access to the storage. In a SAN, a separate network of storage devices forms storage space that is allocated to different workstations and this separate network is itself connected to the network medium, which connects the different workstations.

Conventional SANs do not perfectly solve all the mass storage needs for an enterprise. In particular, maintenance and provisioning of the storage space within the conventional SAN is difficult to accomplish and wasteful of the physical resources. To address these concerns, many recent developments in this field have involved virtualizing the storage space so that there is little, or no, correlation between the physical disk drive devices where the data actually resides and the logical disk drive devices which are the targets for a workstation's data access request. One such currently produced product that is known in the industry and provides a substantially virtualized view of the storage space within a SAN is the MAGNITUDE™ SAN manufactured by Xiotech Corporation of Eden Prairie, Minn.

The MAGNITUDE™ SAN aggregates physical drives into a centralized "virtualized" storage pool and has the ability to stripe across and utilize all available space in a centralized storage pool. From this pool, a user carves out storage into "virtualized disks" and assigns that storage to whichever workstation that needs it. Within the SAN, the workstations see the MAGNITUDE™ SAN's virtual disks as Logical Unit Numbers (LUNs). Within MAGNITUDE™ SAN, virtualization refers to different levels of logical constructs rather than to physical storage devices (e.g. SCSI hard disk drives).

The MAGNITUDE™ SAN is responsible for presenting the available virtualized disks as addressable devices on the Fibre Channel fabric. As a result, remote servers and workstations need only generate a typical block-level command (e.g., SCSI-3 command) to access blocks on an available logical drive. The MAGNITUDE™ SAN, however, receives this conventional protocol request and converts it into a virtual request packet (VRP) for internal processing. The MAGNITUDE™ SAN internally unencapsulates, parses and processes a VRP message utilizing translation tables in order to eventually generate, for example, SCSI commands to access multiple SCSI devices. The MAGNITUDE™ SAN enforces access controls at the virtualized disk level. Individual virtualized disks can be assigned to a specific workstation to allow the workstation and its storage to be isolated from another workstation and its storage.

Within the MAGNITUDE™ SAN system, for example, there is at least one controller having at least one processor, memory, and support circuits for presenting storage space to the servers by directing and controlling access to the disk storage subsystem. The controller also includes firmware, that when executed by the processor, performs many levels of translations needed to permit receiving a request involving a virtualized drive and actually performing data accesses to multiple physical devices. In particular, the servers send data access requests (e.g., read/write commands) to the controller directed to a particular logical disk drive and the controller translates the request into commands that access data on the physical drives.

As with any complex products, hardware and/or software component failures may occur that typically inconvenience the users of such products. Such failures may simply be "soft" failures that cause a temporary disruption (i.e., "glitch") or in a worst-case scenario, "hard" failures that cause server outages and network downtime. Soft failures include software or firmware glitches, such as being caught in a software loop, or hardware glitches, such as a temporary loss or degradation of a signal to a component (e.g., IC). On the other hand, hard failures include, for example, corrupted software or a degradation of hardware components to the extent that performance is unacceptable or non-operational.

Hard failures are usually not recoverable by simply reinitializing the system. Rather, the system usually needs to be powered down, the failed component is replaced, and the system is then reinitialized. Soft failures, on the other hand, are usually administered by initially reinitializing the system, prior to isolating the failure to a specific component.

However, reinitialization, for example, of a SAN system may take several minutes, since the servers must be powered down during the process. Such extended downtime is inconvenient to the users of the system, since they are denied access to their applications and data for prolonged periods. Therefore, there is a need in the art for improved fault recovery, as well as reducing the downtime of a SAN system resulting from such faults.

SUMMARY OF THE INVENTION

These and other needs are met by embodiments of the present invention, which provides a method and apparatus for reinitializing firmware in the event of a fault in a storage area network comprising at least one storage controller having programmable memory and RAM, said at least one storage controller for controlling data access between at least one host server and a storage device. The method is provided during background operations, and includes detecting a fault and suspending data access commands from the at least one host server.

The firmware stored in programmable memory is reinstalled, and the at least one storage controller is reinitialized. The reinstallation of the firmware and reinitializing of the controller is quickly completed such that data access commands from the at least one host server to the at least one storage device are satisfied prior to the host server timing out and initiating a data access error message.

As such, the inventive method and apparatus reduce the downtime for repair and maintenance when a fault is detected. Furthermore, in one embodiment, failure tracking is also provided by identifying and recording the types of faults detected, which may be subsequently used as reference information and fault tracking. In another embodiment, the reinstalled version of firmware may be an upgrade version, thereby resolving the detected fault, as well as providing a firmware upgrade.

BRIEF DESCRIPTION OF THE DRAWINGS

The present invention is described with reference to the following figures.

To facilitate understanding, identical reference numerals have been used, where possible, to designate identical elements that are common to the figures.

DETAILED DESCRIPTION OF THE INVENTION

In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention includes a method and apparatus for reinitializing firmware in a controller that controls disk access command, illustratively, sent from a host (e.g., one or more servers) to a storage device (e.g., storage array). The firmware reinitialization is performed in the background of normal server operations, without having to power down the servers, which is costly in terms of productivity and efficiency by users of the servers and storage device.

Exemplary Storage Area Network

Figure 1:
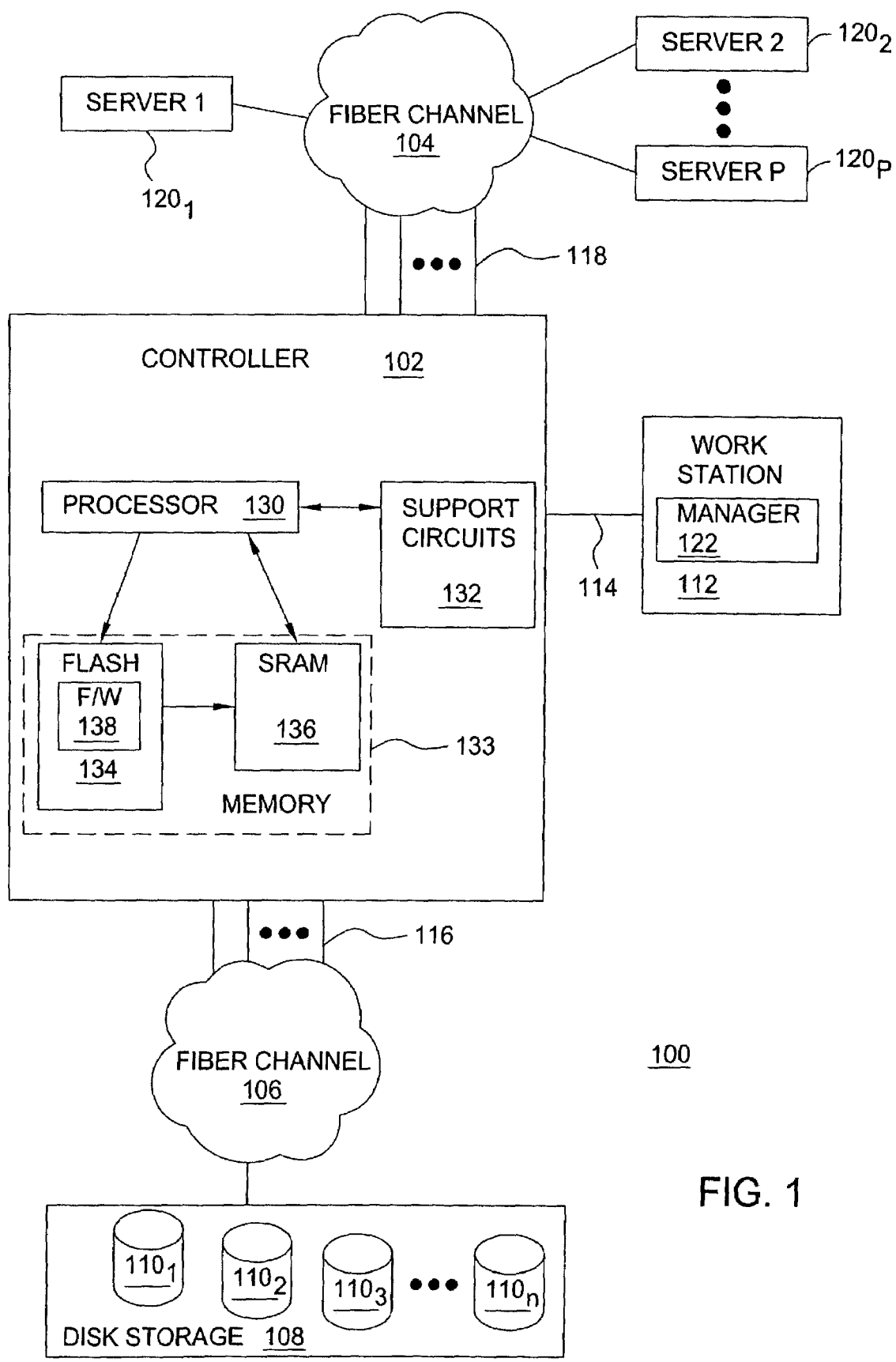
FIG. 1 depicts a block diagram of an exemplary fibre channel storage area network (SAN)

FIG. 1 depicts a block diagram of an exemplary fibre channel storage area network (SAN) 100. Embodiments of the present invention can provide conventional functionality and operation within this environment 100. The SAN environment 100 comprises at least one server 120, a controller 102, a workstation 112, and a disk storage subsystem 108. In particular, a plurality of individual disk drives $1110_1$ through $110_n$ (collectively disk drives 110) is connected together to form the storage subsystem 108.

This storage subsystem 108 is connected via fibre channel media 106 and protocols to different back-end interfaces 116 of the controller 102. The disk storage subsystem connections as depicted in FIG. 1 are schematic in nature. The actual physical connection topology of the different disk drives 110 to the controller 102 is not explicitly depicted in FIG. 1, as numerous different topologies are recognized to be functionally equivalent.

One exemplary topology may be to have four fibre channel loops, each loop having plural hard drives and each loop connected to a different interface 116 of the controller 102. The exemplary network environment 100 is implemented using fibre channel; however, the use of other present and future-developed networking technologies providing similar functionality are also contemplated.

Within the environment 100, a number of servers $120_1$ through $120_p$ (collectively servers 120) are connected to various front-end interfaces 118 of the controller 102. These connections also utilize exemplary fibre channel media 104 to provide various connection topologies between the servers 120 and the controller 102. For example, the fibre channel media 104 may include one or more switches (not shown) having respective output ports connected to a front-end controller interface 118 and input ports connected to individual servers 120 or loops of individual servers.

The controller 102 is responsible for presenting storage space to the servers 120 by directing and controlling access to the disk storage subsystem 108. This access is not dependent on the underlying physical arrangement and structure of the disk drives 110; but, rather, is provided in a virtual (or logical) manner, thereby simplifying maintenance and management of the storage space made available to the servers 120. In operation, the controller 102 presents to each server $120_1$ to $120_p$ respective logical disk drives that can be accessed as if they were physical disk drives connected to the server. The servers 120 send data access requests (e.g., read, write, copy, etc.) to the controller 102 directed to a particular logical disk drive and the controller 102 translates the request into commands that access data on the physical drives 110. For example, with a read request, the controller 102 also arranges any retrieved data and provides it back to the requesting server $120_p$.

FIG. 1 further depicts a high-level block diagram of the controller 102 suitable for use in the SAN environment 100 of FIG. 1. Specifically, the controller 102 comprises a processor 130 as well as memory 133, such as programmable permanent memory 134 (e.g., Flash memory) and RAM 136 (e.g., SRAM) for storing various control programs 138. The processor 130 cooperates with conventional support circuitry 132 such as power supplies, clock circuits, cache memory and the like as well as circuits that assist in executing the software routines stored in the memory 133. As such, it is contemplated that some of the process steps discussed herein as software processes may be implemented within hardware, for example as circuitry that cooperates with the processor 130 to perform various steps. The controller 102 also contains input/output (I/O) circuitry that forms an interface between the various functional elements communicating with the controller 102. For example, in the embodiment of FIG. 1, the controller 102 communicates with the back-end and front-end interfaces 116 and 118, as discussed below in further detail with regard to FIG. 2. The controller 102 may also communicate with additional functional elements (not shown).

Although the controller 102 of FIG. 1 is depicted as a general-purpose computer that is programmed to perform various control functions in accordance with the present invention, the invention can be implemented in hardware as, for example, an application specific integrated circuit (ASIC). As such, the process steps described herein are intended to be interpreted broadly, as well as being equivalently performed by software, hardware, or a combination thereof.

The creation and modification of the storage configuration implemented by the controller 102 is accomplished via a workstation 112. The workstation 112 connects to the controller 102 via a network connection 114, such as Ethernet, and facilitates a storage configuration manager 122 that interacts with the controller 102. The storage configuration manager 122, for example, can be presented via a web server such that a user can configure the controller 102 using a web browser on workstation 112. Alternatively, the storage configuration manager 122 can be a standalone application that communicates with the workstation 112 via TELNET or possibly a proprietary client application. Utilizing the storage configuration manager 122, a user such as a system administrator can define, for example, the storage space (and its configuration) that is allocated to each of the servers 120. For example, to allocate storage to server $120_2$, a user interfaces with the storage configuration manager 122 to specify, illustratively, that a new disk is needed, the new disk is a logical or virtual disk rather than a physical disk, RAID level, and the like. The specific algorithm and manner in which the physical disk drives 110 are presented as virtual disk space to the servers 120 are not critical to the understanding of the exemplary embodiments of the present invention. Accordingly, this virtualization is mentioned so as not to obscure the present invention but, rather, is described to allow a clear understanding of the many aspects of the system.

The servers 120 are able to determine which front-end (FE) interface 118 to send a particular request based on a target identifier. The controller 102 receives a data request on the FE interface 118 and, through a process of multiple translations using configuration information, accesses the appropriate physical drives 110 to satisfy the request.

Figure 2:
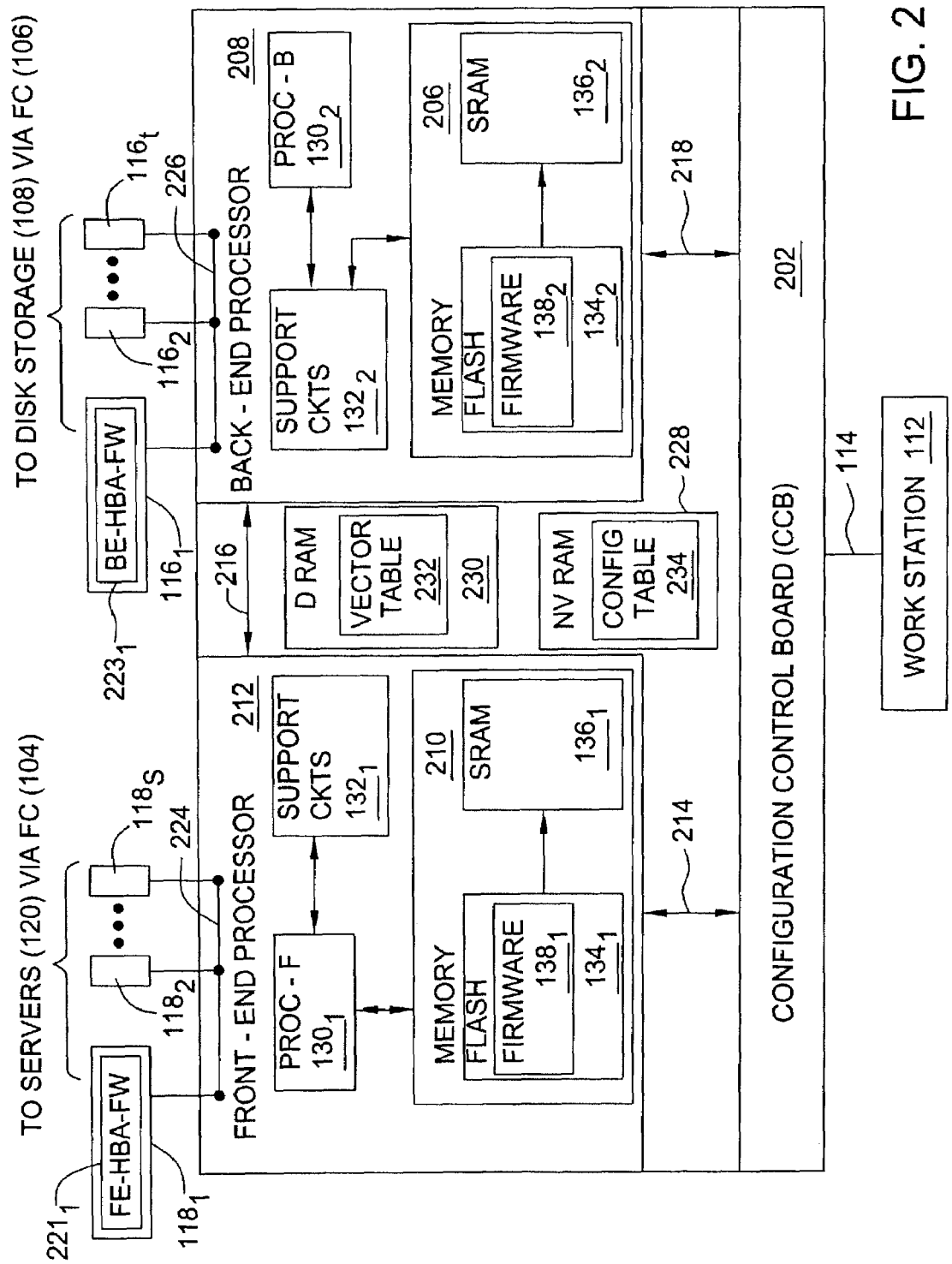
FIG. 2 depicts a block diagram of an exemplary data storage controller for accessing data in a storage array of FIG. 1.

FIG. 2 depicts a block diagram of an exemplary data storage controller 201 for accessing data in a storage array 108 of FIG. 1. The controller 201 depicted in FIG. 2 is one is illustratively utilized in the MAGNITUDE™ storage area network (SAN), manufactured by Xiotech Corporation of Eden Prairie, Minn.

According to one embodiment, the controller 201 comprises three major processors: a front-end processor 212, a back-end processor 208, and a configuration and control board (CCB) 202. The controller 201 further comprises DRAM 230 and non-volatile RAM (NVRAM) 228. The DRAM 230 is used as a shared memory pool to store the I/O requests and responses, and in one embodiment, is 64 megabytes (MB). However, the size of the DRAM should not be considered as limiting. Also included within the controller 201 is the NVRAM 228, or other functionally equivalent storage that is accessible by the front-end 212 and back-end 208 processors to retain a copy of the system configuration information in a configuration table 234.

The front-end processor 212 is coupled via a bus 224 to plural front-end interfaces 118, such as fibre channel host bus adapters (HBAs) $118_1$ to $118_S$ (collectively front-end (FE) HBAs 118). It is noted that a HBA is synonymous with a host adapter board (HAB), which reflects terminology used by some vendors.

In one specific embodiment, the bus 224 is a PCI bus and the HBAs 220 are Qlogic® Fibre Channel interface boards. Each FE-HBA $118_1$ to $118_S$ connects with one or more of the servers 120. This side of the controller 102 is referred to as the "front-end" or the "host end" which makes the FE-HBAs 118 "host interfaces". It is noted that each of the FE-HBAs 220 may have associated firmware (e.g., firmware $221_1$) to control functional aspects of the FE-HBA 220. In one embodiment, the firmware 221 is stored in a programmable memory (e.g., Flash memory) directly on the FE-HBA 220. Alternatively, the firmware for the HBA's 220 may be stored in the programmable memory 134 on the FE processor 212.

The front-end processor 212 serves as a "controller" that comprises a processor $130_1$ and support circuitry $132_1$ as discussed with regard to FIG. 1. The processor $130_1$ may be a microprocessor such as an Intel i960® type processor. The front-end processor 212 also includes memory 210 comprising RAM (e.g., SRAM) $136_1$ that caches incoming and outgoing commands and data, as well as programmable (e.g., Flash) memory $134_1$ that stores the front-end processor's firmware $138_1$. Incoming disk access requests are received via the host interfaces 118. The front-end processor 212 uses the configuration information in NVRAM 228 to determine which blocks of the virtual disk the access request relates to, and then passes this information to the back-end processor 208. The front-end processor 212 and back-end processor 208 are connected via a bus 216, such as a PCI bus.

The back-end processor 208 is coupled to plural back-end interfaces 116, such as fibre channel host bus adapters (HBAs) $116_1$ to $116_t$ (collectively back-end (BE) HBAs 116) via a bus 226. This side of the controller 201 is referred to as the "back-end" or the "device end" that forms the BE-HBAs 116 "device interfaces". In one specific embodiment, the bus 226 is a PCI bus. Each BE-HBA $116_1$ to $116_t$ connects with one or more of the physical disks 110 of the storage device 108. The back-end processor 208 executes its own firmware code to perform its respective operations. It is noted that each of the BE-HBAs 116 may also comprise firmware (e.g., firmware 2231) to control functional aspects of the BE-HBA 116. Similar to the front-end controller 212, the BE-HBAs 116 may have firmware 223 stored in a programmable memory directly on the BE-HBAs 116. Alternatively, the firmware for the HBA's 116 may be stored in the programmable memory 134 on the BE processor 212.

The back-end processor 208 also serves as a "controller" that comprises a processor $130_2$ and support circuitry $132_2$ as discussed with regard to FIG. 1. That is, the processor $130_2$ may also be a microprocessor such as an Intel i960® type processor. The back-end processor 208 also includes memory 206 comprising RAM (e.g., SRAM) $136_2$ that caches incoming and outgoing commands and data, as well as programmable permanent memory $134_2$ that stores the back-end processor's firmware $138_2$. The back-end processor 208 receives, from the front-end processor 212, information about a virtual disk access request and generates the actual, physical disk access commands to access the various blocks of the physical disk drives 110a–110d which correspond to the requested blocks of the virtual disk access request.

Busses 214 and 218, such as PCI busses, connect the CCB 202 to both the front-end 212 and back-end 208 processors, respectively. One alternative to the separate busses 214–218 depicted in FIG. 2 is a single bus that connects all three components 202, 208 and 212. The actual hardware of a CCB 202 is not depicted in FIG. 2, however, the CCB 202 typically comprises a network interface (such as an i82559 Ethernet Controller), a processor (such as an Intel i960), memory (e.g. RAM, programmable memory, NVRAM, and the like), timer circuitry, and interface circuitry for communicating with the front-end 212 and back-end 208 processors over busses 214 and 218.

The CCB 202 includes management functionality similar to that available from conventional SAN controllers. In other words, the CCB 202 includes an interface for receiving configuration instructions and performing many of the functions needed for allocating and provisioning storage space accordingly. The functions of the CCB 202 include, for example, configuring and controlling RAID devices, backing-up, copying or mirroring data within the storage system 108, and configuring and managing server connections. Additionally, the functions of the CCB 202 may also include maintaining system event logs, monitoring environmental and power conditions, recording operation statistics, providing notification of failures, performing diagnostics, and reporting the status of the controller 201 and the storage subsystem 108 to the workstation 112.

The firmware 138 for the front-end and back-end processors 212 and 208 is stored in the programmable (e.g., Flash) memory 134 associated with each processor 212 and 208. For each processor 212 and 208, the firmware stored in the programmable memory 134 is copied into the SRAM 136 for execution by the processor 130. The SRAM 136 has storage space specifically designated for the microcode copied from the programmable memory 134. The processor 130 interacts with the SRAM 136 to execute the microcode therein to perform the functional aspects of the controller 201. Specifically, the firmware 138 comprises software instruction (e.g., microcode), that when executed by the processor 130, allows the controller 201 to perform specific operations necessary to control data access (i.e., reading and writing data) to and from the disk storage 108.

In instances where a failure occurs, the controller 201 is capable of initiating a reinitialization process in an attempt to overcome the failure. Reinitialization is performed for failures deemed as "soft" failures, i.e., non-fatal hardware and software failures. Soft failures include software glitches, such as corrupted instruction or data, end case bugs, as well as non-fatal hardware failures, such as hazardous state machines, parity errors, clock tolerance issues, among others.

Figure 3:
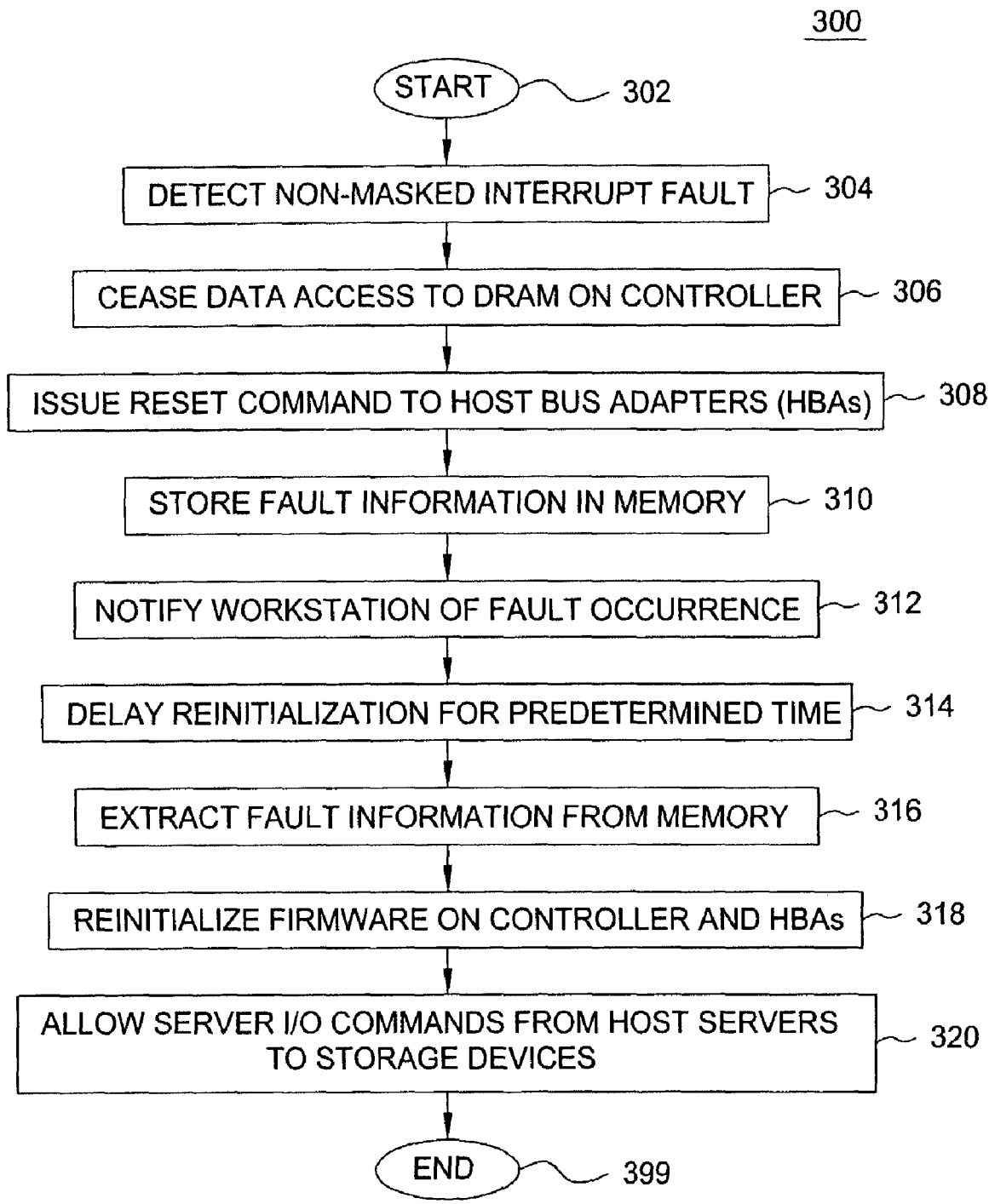
FIG. 3 depicts a flow diagram of an exemplary method for reinitializing the controller of FIG. 2.

FIG. 3 depicts a flow diagram of an exemplary method 300 for reinitializing the controller 201 of FIG. 2. The reinitialization process depicted by method 300 is provided to reduce the downtime of the controller 201, by reinitializing (i.e., rebooting) the controller 201 in an effort to alleviate a soft failure. That is, fault recovery is first attempted by reinitializing the controller 201, prior to replacing the controller or other hardware, which is much more time-consuming and costly. By simply reinitializing the controller 201, many failures that are both hardware related and minor software glitches, can be resolved in a manner that is transparent to the users. Further, the reinitialization process depicted by method 300 may be used to track the type of failures (faults) that may occur. Tracking the time and type of failure provides data for improving reliability and quality concerns, as well as notifying a system administrator that system downtime for maintenance may be necessary, which may be scheduled at a time where system usage is minimal.

When a host server 120 issues an I/O request to access data (read/write data) from a storage device 108, the I/O request must be satisfied within a certain time period (i.e., window) before the operating system of the server initiates a data access error. The window duration is operating system dependent, and the window is usually at least 25 to 30 seconds long for most of the popular operating systems (e.g., WINDOWS®, LINUX, among other operating systems). The window allows the server to repeat the I/O request for the duration of the window in the event that the previous I/O requests fail.

One inventive feature of method 300 is to provide the reinitialization process to the firmware 138 on the controllers 212 and 208 and the HBAs 116 and 118 within the time limits defined by the window described above. By performing method 300 within the time constraints allotted by the operating system, the reinitialization process may be provided without having to power down the host servers 120 or the generation of an error message that may coincide with a loss of data.

Referring to FIG. 3, the method begins at step 302, where the host servers 120, controller 201, and storage device 108 are operating under normal operating conditions. That is, the storage system 100 is satisfying server data access requests to the storage device 108 via the controller 201. At step 304, the controller 201 detects a fault.

Figure 4:
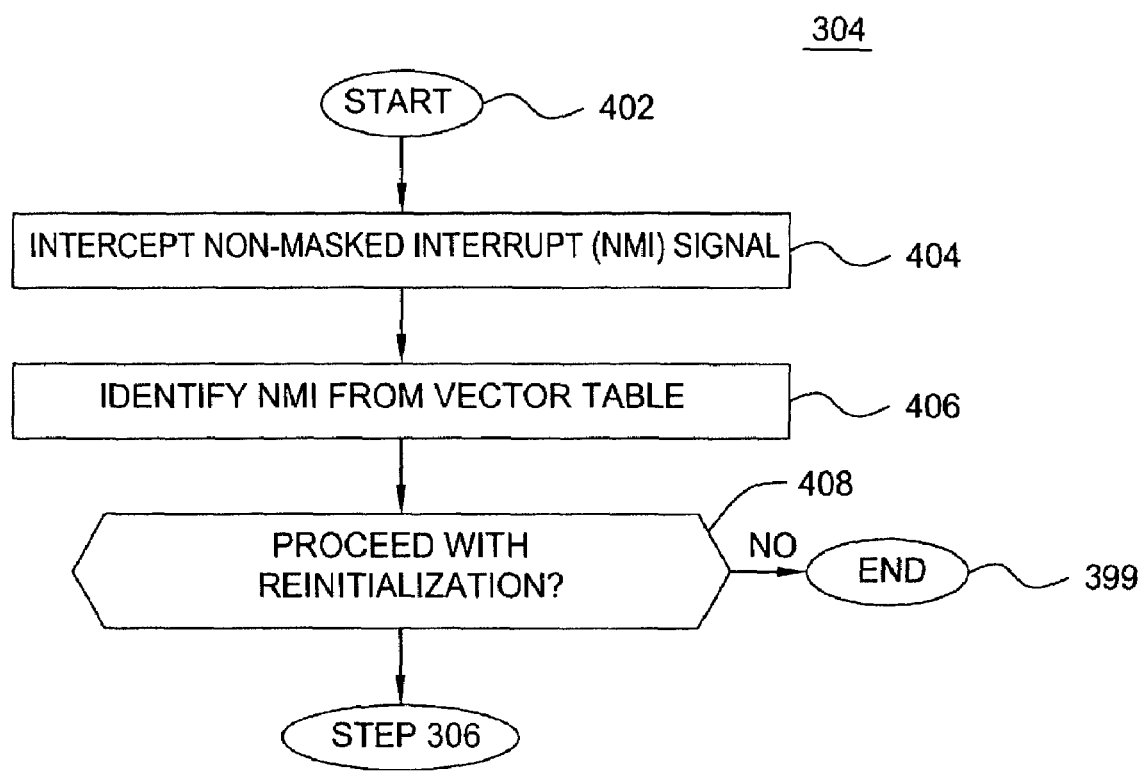
FIG. 4 depicts a flow diagram of a method of detecting faults according to the method of FIG. 3.

FIG. 4 depicts a flow diagram of a method 304 of detecting faults according to the method 300 of FIG. 3. Method 304 begins at step 402 and proceeds to step 404, where the firmware 138 of the controller 201 intercepts a non-masked interrupt signal. In particular, a non-masked interrupt (NMI) is sent, for example, by a hardware component to the controller processor 130. A non-masked interrupt is defined as system critical. In one embodiment, the processor 130 has a designated pin for receiving such NMI signals. Once a fault is detected by the firmware 138, at step 406, the firmware 138 utilizes a vector (i.e., mapping) table 232 stored in the DRAM 230 to identify the type of fault. The vector table 232 contains a listing of NMIs used in conjunction with a marker or flag indicating whether the reinitialization process 300 should proceed for a particular NMI.

At step 408, a determination is made as to whether to proceed with the reinitialization process of method 300. That is, when a fault is detected, the firmware 138 uses the flag to determine whether the reinitialization process should be implemented. If at step 408, the identified fault does not have a flag indicating to proceed with the reinitialization process, then the method 304 proceeds to step 399 where the method 304, as well as method 300 end. Accordingly, the system 100 halts until the controller board 130 is physically replaced. Conversely, if at step 408, the NMI for the identified fault does have a flag indicating to proceed with the reinitialization process 300, then method 400 proceeds to step 306.

Referring to FIG. 3, the firmware 138 instructs the processor 130 to cease accessing data from the DRAM 230 on the controller 130. Recall that the DRAM 230 is used as a cache to temporarily to store the data requests and responses. In particular, the controller 130 assumes that data stored in the DRAM 230 is bad or invalid. As such, the information in the DRAM 230 is frozen.

At step 308, the firmware 338 instructs the processor 130 to issue a reset command to the host bus adapters 118 and 116. The reset command stops the HBAs 118 and 116 from exchanging information with the host servers 120 and the storage device 108.

At step 310, the firmware 338 instructs the processor 130 to store the fault information. In one embodiment, the fault information is stored as a table in the DRAM 230. The stored fault information illustratively comprises code trace back and register values for each level, and in some cases, hardware fault information. The stored fault information is used as a reference log for tracking purposes, such that trend analysis and/or other product reliability and quality reference information.

At step 312, the firmware 338 instructs the processor 130 to notify the workstation 112 that a fault has occurred. The workstation 112 acknowledges and at step 314, the firmware 338 delays the reinitialization process for a predetermined time (e.g., 4 seconds). The delay is provided such that at step 316, the workstation 112 has time to extract and then archive the stored fault information for future reference.

At step 318, the firmware 138 on the controller is reinitialized. It is noted that the reinitialization begins once the predetermined time delay lapses, regardless of whether the workstation 112 has completed extracting the fault information. That is, priority is given to the reinitialization step 318 over the extraction step 316, since the controller must be reinitialized before the repeated data requests by the host servers time out, thereby causing a system error.

Figure 5A:
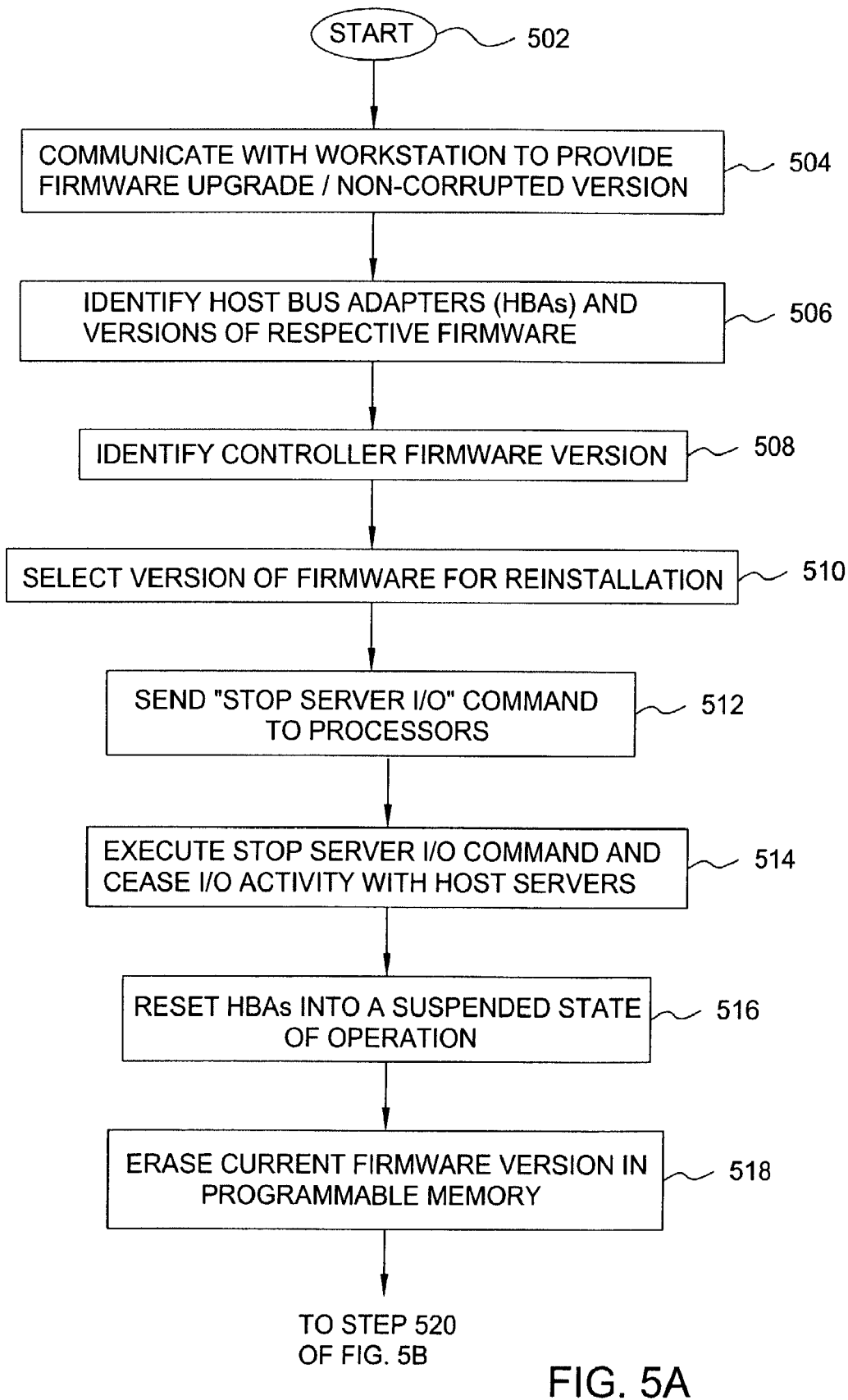
FIGS. 5A–5C depict a flow diagram of a reinitialization step according to the method of FIG. 3.
Figure 5B:
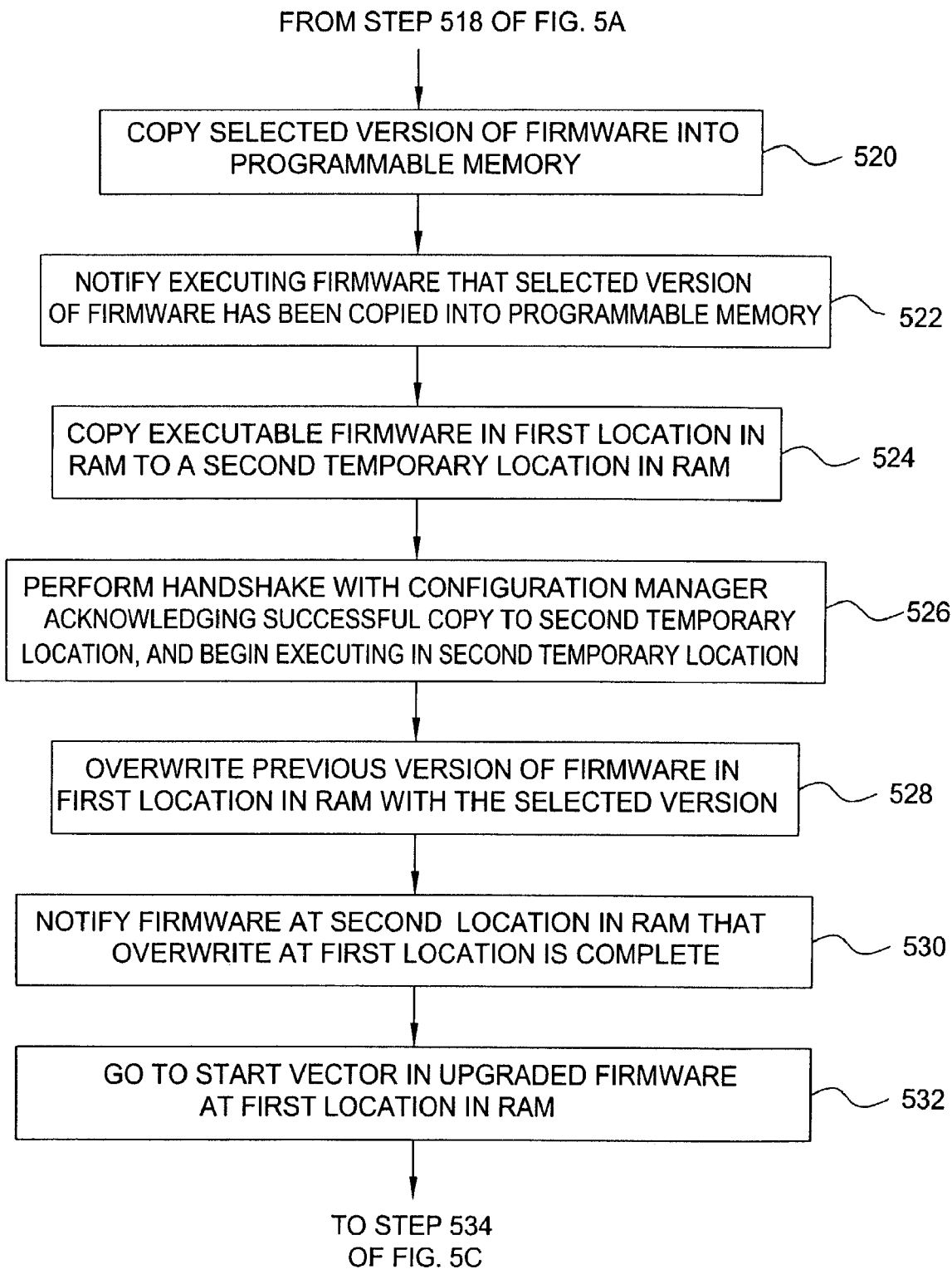
Figure 5C:
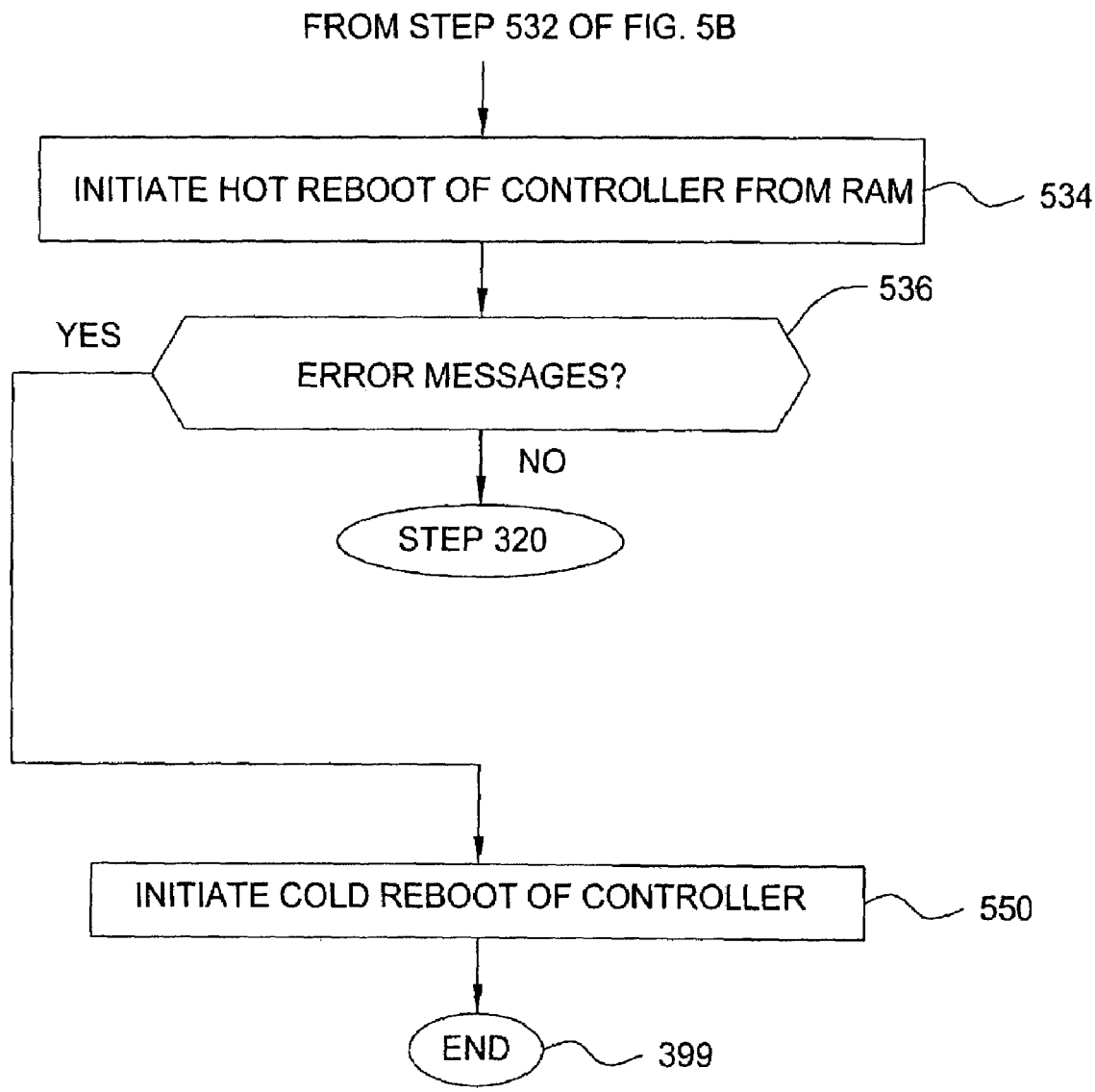

FIGS. 5A–5C depict a flow diagram of a reinitialization step (i.e., process) 318, according to the method 300 of FIG. 3. The reinitialization process 318 clears out the DRAM 230, as well as reloads the firmware 138 in the memory 134 with a non-corrupted copy from a file stored on the workstation 112. In one embodiment, the workstation 112 may store various file versions of the firmware 138. In particular, the firmware files stored on the workstation 112 may include an upgraded version, the same version currently installed, and/or a lower version of the firmware installed on the controller. In instances where an upgraded version is available and utilized for reinstallation, the reinitialization process 318 provides dual functions. First, the detected fault is responded to by reinstalling the firmware, and second, a firmware upgrade may additionally be provided to the controller 201. It is noted that if a known problem may be temporarily resolved by utilizing a lower revision until a permanent fix is provided, then the lower revision firmware is also available for reinstallation.

Referring to FIG. 5A, the reinitialization process 318 begins at step 502, and proceeds to step 504, where the firmware communicates with the workstation 112 to provide the file containing the new firmware for reinstallation. Thus, the currently installed firmware 138 on the controller 201 is responsible for initiating the reinitialization process 318. For purposes of better understanding the invention, the term "new firmware" shall mean installing an upgrade version, the same version, or older version of firmware that is presently installed on the controller 201. The steps for reinstalling any of the versions of firmware 138 on the controller 130 are the same.

At step 506, the host bus adaptors 116 and 118 that are coupled to the controller 201 are identified by their respective firmware versions. It is noted that in the embodiment shown in FIG. 2, the firmware 138 of both controllers 212 and 208, as well as the firmware 221 and 223 of the HBAs 118 and 116 are reinstalled contemporaneously. At step 508, the versions of the firmware 138 on the controller 201 are identified and reported to the configuration manager 122.

At step 510, the workstation 112 selects the version of the firmware to be reinstalled into the memory (e.g., Flash) on the controller 201. As discussed above, the firmware may be an upgraded, current, or older version of the installed firmware 138. In one embodiment, the workstation is set by default to always provide the latest version of firmware.

At step 512, the configuration manager sends a "stop server I/O" command to the processors 130 of the controllers 212 and 208. The stop server I/O command is used to suspend the controllers 212 and 208 from providing data access to the storage devices 108 by the servers 120. At step 514, the processors execute the stop server I/O command and cease I/O activity with the host servers 120. It is noted that steps 306 and 308 of FIG. 3 represent crude (instant ways) to cease I/O activity, as compared to step 514, where the processor notifies other applications currently running to shut down in a controlled manner. The method 500 then proceeds to step 516.

At step 516, the HBAs 116 and 118 are reset. Specifically, the HBAs 116 and 118 switch to a suspended state such that they do not interact with either the servers 120 or the storage devices 108, thus reaching the maximum allowed outstanding requests allowed on the fibre as negotiated by the protocol.

At step 518, the current version of firmware installed in the programmable memory (e.g., Flash) 134 is erased. The memory 134 is erased at step 518 to provide verification that the memory is fully operative.

At step 520, the configuration manager 122 at the workstation 112 copies the selected version of the firmware into the programmable memory (e.g., Flash memory) 134 in the controllers 212 and 208. As noted above, the executable microcode is a copy of the firmware stored in the RAM (e.g., SRAM) 136. At step 522, the executing microcode in the SRAM 136 is notified that the selected firmware has been copied into the programmable memory 134. In one embodiment, the notification is provided by a handshake via shared memory semaphore (signaling). At step 524, a portion of the executable firmware in the SRAM 136 is copied to a second temporary (unused) location in the SRAM 136. At step 526, the configuration manager 122 and processors 130 perform a handshake acknowledging successful completion of step 534, and the executing firmware jumps to the second temporary location in the SRAM 136 for continued execution therefrom. The reinitialization process 318 then proceeds to step 528.

At step 528, the previous version of firmware located in the first location of the SRAM 136 is overwritten with the selected version provided at step 510. In one embodiment, the selected version is copied directly from the programmable memory 134. Alternatively, the selected version may be copied from another source (e.g., configuration manager 122).

At step 530, the firmware at the second location (memory address) in the RAM is notified that the overwrite step 528 is complete. At step 532, the processor 130 starts executing the new firmware from a start vector of the selected firmware stored at the first location (memory address) in the SRAM 136.

It is noted that steps 520 through 528 are discussed in terms of reinstalling the firmware 138 of the controllers 201 with new firmware only. In this embodiment, the firmware of the HBAs 116 and 118 is stored in the memory of the controller 201. In a second embodiment, the HBAs 116 and 118 store their respective firmware 223 and 221 on the HBAs separate and apart from the controller firmware 138. For any of the above-mentioned embodiments, the HBA's firmware is loaded along with that of the controllers 201. When the HBAs are reset (suspended) and then released, the HBAs will load their new version of the firmware during initialization in a similar manner as described in steps 520 through 528 above.

At step 534, the newly installed firmware in the SRAM 136 initiates a "hot-reboot" of the controllers 212 and 208. The hot-reboot is an abbreviated initialization process of the controllers 212 and 208. Specifically, during the hot reboot process, the new firmware interacts with the NVRAM 228, which stores pre-reinstallation system configuration information, such as the servers 120 coupled to the controller 210, the virtual devices, the physical devices, and the like. The reinstalled firmware scans the physical drive information for failed disk drives, performs a handshake with the HBAs 116 and 118, and reinitializes the firmware of the HBAs.

At step 536, the configuration manager 122 monitors for error messages during the hot reboot of step 534. If at step 536, the hot boot initialization is error free, then the version number of the reinstalled firmware is sent to the configuration manager 122 to signify completion of the reinstallation, and the reinitialization process 318 proceeds to step 320 of FIG. 3. At step 320, the server I/O commands from the host servers 120 to read and write data to the storage devices 108, and at step 399, method 300 ends. As such, the method 300 reinitializes the firmware 138 on the controller 201 and the HBAs 116 and 118 within the time constraints allotted by the operating system, without having to power down (reboot) the host servers.

However, if at step 536, the configuration manager 122 receives an initialization error message, then the method 300 proceeds to step 550, where the servers 120 are powered down and the system 100 is rebooted again. That is, any critical errors will halt the process, thereby forcing the user to perform a cold boot. It is noted that if the process is aborted early enough (e.g., within ten minutes since the last failure), the system is left in its previous active state.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for reinitializing firmware in the event of a fault in a storage area network comprising at least one storage controller having programmable memory and random access memory (RAM), said at least one storage controller for controlling data access between at least one host server and a storage device, comprising:
   detecting a fault;
   suspending data access commands from said at least one host server;
   reinstalling firmware stored in programmable memory;
   reinitializing the at least one storage controller; and
   provisioning data access commands from said at least one host server to said at least one storage device prior to receiving a data access error message
   wherein said detecting step further comprises:
      identifying said fault;
      storing fault information pertaining to said identified fault;
      delaying said reinitialization step for a predetermined period; and
      extracting and archiving said stored fault information prior to said reinitialization step.

2. The method according to claim 1, wherein said detecting step comprises detecting non-masked interrupt faults.

3. The method according to claim 1, wherein the suspending step further comprises issuing a reset command to host bus adaptors communicating with the at least one servers and the storage device.

4. The method according to claim 1, wherein the suspending step is initiated from firmware currently installed in said processor.

5. The method according to claim 1, wherein the reinstalling firmware step further comprises selecting a version of firmware from the group consisting of a same version, a previous version and a later version of firmware installed on said at least one controller.

6. The method according to claim 1 wherein said reinstalling step further comprises:
   erasing a current version of firmware installed in programmable memory on the controller;
   copying, a second copy of the current version of firmware stored in a first portion of RAM to a second portion of the RAM; and
   overwriting the current version of firmware in the first portion RAM with new firmware.

7. The method according to claim 6, wherein said reinitialization step is initiated from the reinstalled version of firmware in the first portion of RAM.

8. The method according to claim 6, wherein said reinitialization step is an abbreviated reboot comprising:
   initializing host bus adaptors (HBAs) coupled to the at least one controller;
   scanning physical drive information for failures;
   clearing said second portion RAM; and
   notifying a configuration manager that the firmware reinstallation is complete.

9. Apparatus for reinitializing firmware in the event of a fault in a storage area network comprising at least one storage controller having programmable memory and random access memory (RAM), said at least one storage controller for controlling data access between at least one host server and a storage device, comprising:
   means for detecting a fault;
   means for suspending data access commands from said at least one host server;
   means for reinstalling firmware stored in programmable memory;
   means for reinitializing the at least one storage controller; and
   means for provisioning data access commands from said at least one host server to said at
   least one storage device prior to receiving a data access error message
   wherein said means for detecting further comprises:
      identifying said fault;
      storing fault information pertaining to said identified fault;
      delaying said reinitialization step for a predetermined period; and
      extracting and archiving said stored fault information prior to said reinitialization step.

10. The apparatus according to claim 9, wherein said means for detecting comprises detecting non-masked interrupt faults.

11. The apparatus according to claim 9, wherein the means for suspending further comprises issuing a reset command to host bus adaptors communicating with the at least one servers and the storage device.

12. The apparatus according to claim 9, wherein the means for suspending is initiated from firmware currently installed in said processor.

13. The apparatus according to cliam 9, wherein the means for reinstalling firmware further comprises selecting a version of firmware from the group consisting of a same version, a previous version, and a later version of firmware installed on said at least one controller.

14. The apparatus according to claim 9, wherein said means for reinstalling further comprises:

erasing a current version of firmware installed in programmable memory on the controller;

copying a second copy of the current version of firmware stored in a first portion of RAM to a second portion of the RA; and overwriting the current version of firmware in the first portion RAM with new firmware.

15. The apparatus according to claim 14, wherein said means for reinitialization is initiated from the reinstalled version of firmware in the first portion of RAM.

16. The apparatus according to claim 14, wherein said means for reinitialization is an abbreviated reboot comprising:

initializing host bus adaptors (HBAs) coupled to the at least one controller;

scanning physical drive information for failures;

clearing said second portion RAM; and notifying a configuration manager that the firmware reinstallation is complete.

* * * * *